United States Patent [19]
Buckman et al.

[11] 3,858,565
[45] Jan. 7, 1975

[54] INTERNAL COMBUSTION ENGINE AIR INTAKE CONTROL SYSTEMS

[75] Inventors: Kenneth Ernest Buckman; Brian Frank Colenutt; Robin Elgar Datlen, all of Southampton, England

[73] Assignee: General Motors Corporation, Detroit, Mich.

[22] Filed: Sept. 17, 1973

[21] Appl. No.: 398,003

[30] Foreign Application Priority Data
Oct. 6, 1972 Great Britain............... 46150/72

[52] U.S. Cl.................... 123/122 H, 123/122 D
[51] Int. Cl............................................ F02m 31/00
[58] Field of Search........ 123/122 H, 122 D, 122 R, 123/133; 261/39 B; 137/468

[56] References Cited
UNITED STATES PATENTS

| | | | |
|---|---|---|---|
| 3,444,847 | 5/1969 | King............................. | 123/122 D |
| 3,714,933 | 2/1973 | Ozaki........................... | 123/122 D |
| 3,726,512 | 4/1973 | Herwig.......................... | 123/122 H |
| 3,744,715 | 7/1973 | Maddochs....................... | 123/122 H |
| 3,744,716 | 7/1973 | Herbert......................... | 123/122 H |
| 3,801,078 | 4/1974 | Denton.......................... | 123/122 H |

Primary Examiner—Charles J. Myhre
Assistant Examiner—R. H. Lazarus
Attorney, Agent, or Firm—C. K. Veenstra

[57] ABSTRACT

In an internal combustion engine air intake control system in which a valve is actuated by a vacuum motor in response to engine intake vacuum so as to control an admixture of heated air with ambient air in an engine air intake passage, and in which the action of said intake vacuum on said motor is modified by a thermo-responsive air bleed valve which bleeds air into said motor at a rate which increases with intake air temperature, a thermo-responsive non-return valve is disposed in the bleed valve housing and is constructed and arranged so that, when the engine is cold the non-return valve is closed but permits fluid flow from said vacuum motor to said vacuum source but not in the opposite direction, but, when the engine has warmed up, opens and permits free communication in either direction between said vacuum motor and said vacuum source, this arrangement ensuring that sudden acceleration of the engine before it has warmed up will not result in a sudden surge of cold air being delivered to the engine.

1 Claim, 7 Drawing Figures

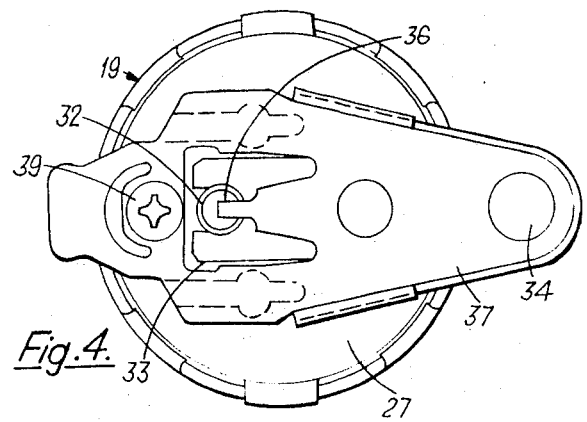
Fig. 4.
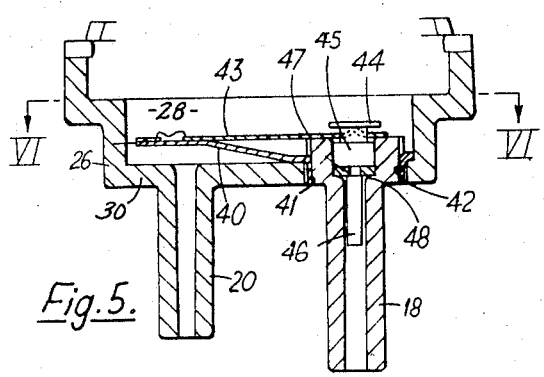
Fig. 5.
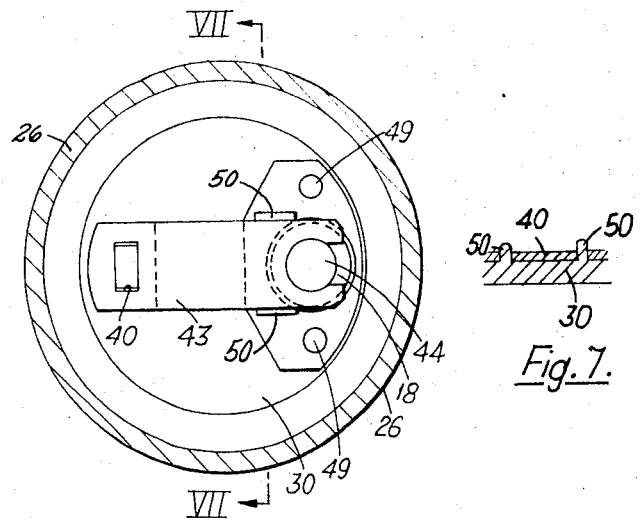
Fig. 6.
Fig. 7.

INTERNAL COMBUSTION ENGINE AIR INTAKE CONTROL SYSTEMS

This invention relates to internal combustion engine air intake control systems, and in particular to a control system by which the temperature of the intake air can be regulated.

The present invention is an improvement in or modification of the internal combustion engine air intake control system according to Pat. No. 3,444,847 and U.S. Pat. No. 3,459,163, in which a valve actuated by a vacuum motor in response to engine intake vacuum is arranged to control an admixture of heated air with ambient air in an engine air intake passage, the action of the intake vacuum on the motor being modified by a thermo-responsive air bleed valve which bleeds air into the motor at a rate which increases with intake air temperature.

In such air intake control systems it is found that in some conditions, particularly when the engine is relatively cold, an undue proportion of unburnt hydrocarbons may be emitted with the engine exhaust gases during conditions of sudden acceleration, and the present invention improves the engine air intake control system by an arrangement which ensures that even during conditions of sudden acceleration with a relatively cold engine, a sufficient supply of relatively warm air is delivered to the engine to prevent an unduly high proportion of unburnt hydrocarbons being emitted in the exhaust gases.

Accordingly, in an internal combustion engine air intake control system according to the present invention a valve actuated by a vacuum motor in response to engine intake vacuum is arranged to control an admixture of heated air with ambient air in an engine air intake passage, the action of said intake vacuum on said motor being modified by a thermo-responsive air bleed valve which bleeds air into said motor at a rate which increases with intake air temperature, and a thermo-responsive non-return valve is disposed in the bleed valve housing and constructed and arranged so that, when the engine is cold the non-return valve is closed but permits fluid flow from said vacuum motor to said vacuum source but not in the opposite direction, but, when the engine has warmed up, opens and permits free communication in either direction between said vacuum motor and said vacuum source.

The scope of the invention is defined by the appended claims; and the invention and the method by which it is to be performed are hereinafter particularly described with reference to the accompanying drawings in which:

FIG. 4 is a plan of the sensor with a housing therefor removed;

FIG. 5 is a view of the lower portion of the sensor unit, taken in section on the line V—V of FIG. 2;

FIG. 6 is a section on the line VI—VI of FIG. 5; and

FIG. 7 is a detail section on the line VII—VII of FIG. 6.

Figure 1:
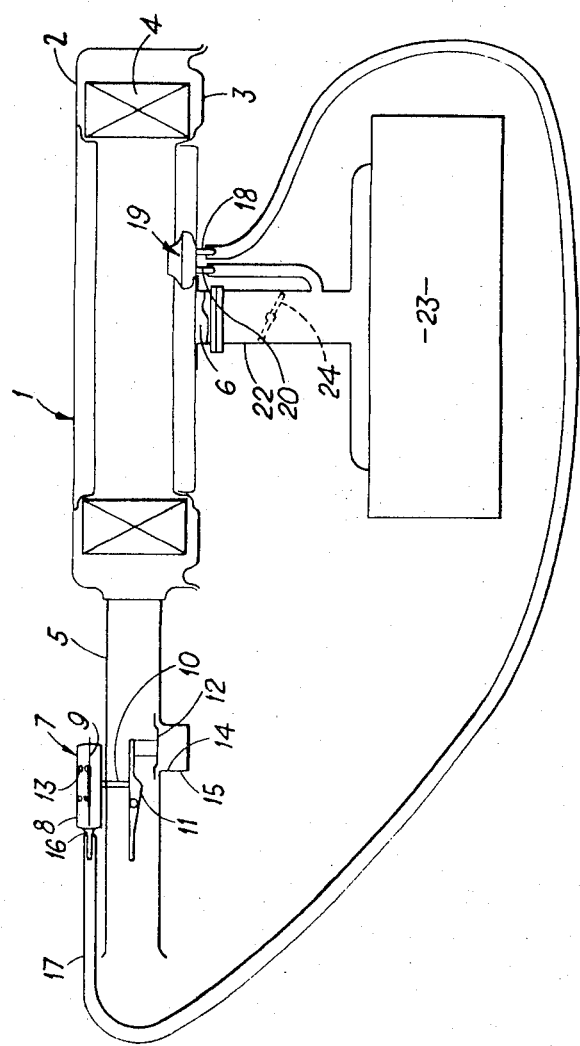
FIG. 1 is a diagrammatic section through an internal combustion engine air intake control system.

FIG. 1 shows an internal combustion engine air cleaner 1 comprising a housing formed by an upper shell 2 and a lower shell 3 between annular seats in which is clamped an annular air filter element 4. The air cleaner 1 has an air intake tube 5 to admit air which passes through the annular filter element 4 and from thence to an outlet 6 in the lower shell 3, the outlet being secured over the intake passage of the carburetter of an internal combustion engine when the air cleaner is mounted on the engine.

Mounted on the intake tube 5 of the air cleaner 1 is a vacuum motor 7 comprising a hollow casing 8 closed by a flexible diaphragm 9 which is connected by a link 10 to a pivotally mounted valve plate 11 which controls the admission of ambient air into the air cleaner through the intake tube 5. One end of the valve plate 11 carries a valve member 12 which is adapted, in response to movement of the valve plate 11, to open or close an opening 14 which provides communication between the intake tube 5 and an auxiliary intake tube 15 adapted to deliver warm air to the air cleaner 1. The auxiliary intake tube 15 may for example be arranged in a position such that it is adjacent a part of the engine, for example the exhaust manifold, which quickly warms up once the engine has started, or it may be connected by a flexible or other conduit to such a part of the engine. A spring 13 within the housing 8 biases the diaphragm 9 so that the valve member 12 normally closes the opening 14 in the auxiliary intake tube 15. The chamber in the vacuum motor 7 closed by the diaphragm 9 is connected through an outlet spigot 16 secured in the wall thereof to one end of a conduit 17 the other end of which is connected to a first spigot pipe 18 on a thermal sensor unit 19 mounted within the air cleaner housing on the lower shell 3, a second spigot pipe 20 on the sensor being connected by a conduit 21 to a source of vacuum, conveniently by being connected into the intake passage 22 of the carburetter of the engine 23 on which the air cleaner is mounted, the conduit 21 being connected into the intake passage 22 downstream of a throttle valve 24 therein.

Figure 2:
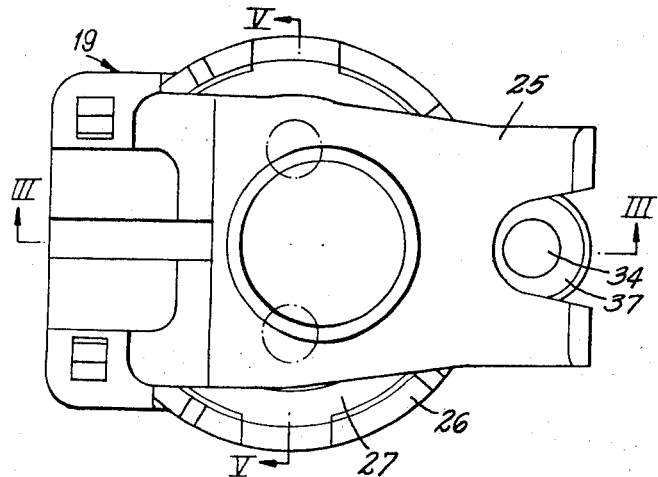
FIG. 2 is a plan of a preferred embodiment of a sensor unit shown in FIG. 1.
Figure 3:
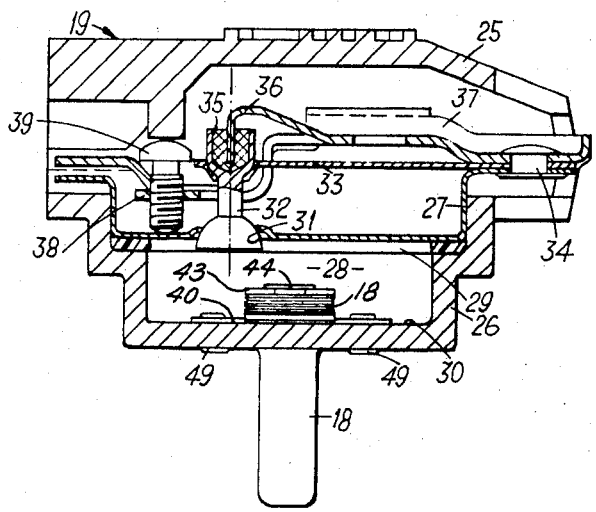
FIG. 3 is a section on the line III—III of FIG. 2.

The preferred embodiment of the sensor unit 19, shown in FIGS. 2 to 7, includes a housing formed by a cover member 25 and a generally cup-shaped body 26 which are conveniently both formed of plastics connected by an integral hinge and adapted to be secured together in known manner by means of snap-fit formations on each. Alternatively, or additionally, the two parts may be secured together with adhesive. As shown in FIGS. 2 and 3, the housing is open at both sides and at its opposite ends.

A closure plate 27 is secured and sealed to the body 26 to form therewith a chamber 28, an annular seal gasket 29 being interposed between the closure plate and body. The aforesaid spigot pipe 20 extends downwardly from the base 30 of the body 26.

In the closure plate 27 there is an opening 31 closable by a valve member 32 carried at one end of a bimetal strip 33 the other end of which is secured on the closure plate 27 by a rivet 34. As shown in FIG. 4, the end of the bimetal strip 33 carrying the valve member 32 is bifurcated to permit the easy assembly of the valve member with the closure plate and bimetal strip; and at its upper end the valve member 32 is formed with a recess 35 in which depends the bent-over end of an arm 36 which is formed integral with a shield plate 37 which overlies the bimetal strip 33 and closure plate 27 and is secured to the closure plate 27 with the bimetal strip 33 clamped therebetween by the rivet 34.

At the end thereof remote from the rivet 34 the shield plate 37 is formed with a depressed tongue 38 with a tapped opening therein in which an adjustment screw 39 is threaded.

Within the chamber 28 there is mounted a carrier plate 40 (FIG. 5) one end of which is formed with an integral internally threaded neck 41 which is press-fitted in an opening in 42 formed in the base 30 of the body 26. Secured to the free end of the carrier plate 40 is one end of a second bimetal strip 43 the other end of which is bifurcated and engages under a necked head 44 of a second valve member 45.

As shown in FIG. 5, the valve member 45 is formed with an elongated guide stem 46 and carries an annular seal gasket 47 which is engageable with an annular valve seat 48 formed in the upper end of the spigot pipe 18, the latter being formed as a plastics moulding which is externally threaded at its upper end so that it can be screwed into the internally threaded neck 41 of the carrier plate 40. The relative positions of the seal gasket 47 and the valve seat 48 can be adjusted by screwing the spigot pipe 18 into or out of the threaded neck 41, the spigot pipe 18 and neck 41 then being sealed by the application of a sealing material to the joint therebetween, and if necessary between the neck 41 and the opening 42.

As shown in FIG. 6, the carrier plate 40 may be secured against rotation in the opening 42 by means of rivets 49 fixed in the base 30 of the body 26. Alternatively, or additionally, as indicated in FIGS. 6 and 7, the base 30 may have parallel shoulders 50 moulded integral therewith so as to locate therebetween a portion of the carrier plate 40 adjacent the neck 41.

OPERATION

When the air cleaner 1 is mounted on an internal combustion engine the sensor unit 19 will warm up as the engine reaches its normal operating temperature. As the bimetal strip 33 is located between the open sides and ends of the housing formed by the cover member 25 and body 26 and is therefore exposed to the air which enters the air cleaner after passage through the filter element 4 therein, it is responsive to the temperature of the air drawn in through the intake tube 5 (a mixture of the ambient air drawn past valve plate 11 and the warm air drawn through intake tube 15). The position of the bimetal strip 33 is adjusted by means of the screw 39 in the shield plate 37, the end of the screw abutting the closure plate 27 and adjustment of the screw 39 tilting the shield plate 37 and bimetal strip 33 relative to the closure plate 27. The bimetal strip 33 is adjusted so that, when the air drawn through the air cleaner 1 is cold, the valve member 26 closes the opening 25 and the intake vacuum from the carburetter of the engine is therefore applied by way of the conduit 21, spigot 20, chamber 28, spigot pipe 18 and conduit 17 to the vacuum motor 7 which thus exerts a closing pull on the valve plate 11 and unseats the valve member 12 from the opening 14 at the inner end of the warm air intake pipe 15, warm air thus being drawn into the air cleaner and delivered to the carburetter so as to assist in efficient combustion of the air-fuel mixture when the engine starts up. At this time, when vacuum is first applied to the vacuum motor 7, air which is withdrawn from the vacuum motor can pass through the non-return valve formed by the second valve member 45, the seal gasket 47 and the valve seat 48 in the spigot 18, the applied vacuum slightly unseating the valve member 45 and gasket 47 from the valve seat 48.

The bimetal 33 bends in response to an increase in air temperature and, at a predetermined air temperature, unseats the valve member 32 from the opening 31 and permits air to enter the chamber 28, thus reducing the vacuum in the motor 7 and permitting spring 13 to unseat the valve plate 11 to allow cold air to enter the intake pipe 5 and to close valve member 12 across opening 14 to reduce the flow of warm air into pipe 5. However, if during the initial running period of the engine, and before the intake air has warmed up sufficiently to cause the valve member 32 to be unseated, the engine is rapidly accelerated the intake vacuum will decrease sharply owing to the throttle then being in the wide open position. Such decrease in vacuum, if immediately applied to the vacuum motor 7 would result in closure of the opening 14 in the warm air intake tube 15, despite the closure of valve 31, 32, and under such conditions only cold air would be drawn into the engine air intake. The effect of this would be that the air-fuel mixture, because of its lower temperature, would no longer be so efficiently burnt in the combustion chambers of the engine and the exhaust could therefore contain an unduly high proportion of undesirable constituents including incompletely burnt hydrocarbons. This undesirable result is prevented by the provision of the additional thermo-responsive non-return valve formed by the second bimetal strip 43 and the valve member 45, gasket 47 and valve seat 48 in the spigot pipe 18. The bimetal strip 43 is not exposed to the intake air while valve member 32 closes opening 31 and is heated initially by conduction from the body 26 of the sensor 19 which, in turn, is heated by both air flow through air cleaner 1 and by conduction or radiation from the part of the engine on which it is mounted. Since the body 26 is made of plastics, which is less readily conductive of heat than metal, the temperature within the chamber 28 rises much more slowly than the temperature of the air passing through the air cleaner 1.

Accordingly, the temperature of bimetal strip 43 corresponds more closely to the actual engine temperature than to the temperature of the air flow through air cleaner 1. Thus, the bleeding of air into the vacuum motor 7 by fluid flow from the intake vacuum source by way of the conduits 21 and 17 is prevented by the closure of the spigot pipe 18 by the bimetal strip 43 and valve 45, 47, until the engine has reached a desired operating temperature, at which time the bimetal strip 43 will bend to open the passage through the spigot pipe 18, whereafter the bimetal strip 33 and valve member 32 will control the vacuum motor 7 so as to maintain a desired intake air temperature.

Thus, with the arrangement described, sudden acceleration of the engine before it has warmed up will not result in a sudden surge of cold air being delivered to the engine and will prevent or reduce the emission of unburnt hydrocarbons which could otherwise result from the sudden drop of air temperature in the air-fuel mixture.

In order to make the operation of the valve member 32 less sensitive to vibration, particularly when at or near its "start to open" position, the recess 35 may be filled with a viscous liquid which, by contact with the arm 36, acts to damp movement of the valve member 32.

We claim:
1. A sensor unit for use in an internal combustion engine having an induction passage for air flow to the engine, a throttle disposed in said induction passage for controlling flow therethrough, said induction passage having a first inlet for receiving ambient temperature air and a second inlet for receiving air warmed to temperatures above ambient temperature, valve means for controlling air flow through said inlets to regulate the temperature of the air flow to said engine, a spring biasing said valve means to permit increased ambient air flow through said first inlet and to decrease warmed air flow through said second inlet, a vacuum motor, and means linking said vacuum motor to said valve means to position said valve means in accordance with variations in pressure sensed by said vacuum motor, said vacuum motor moving said valve means against the bias of said spring to permit increased warmed air flow through said second inlet and to decrease ambient air flow through said first inlet upon a decrease in pressure sensed by said vacuum motor, said sensor unit comprising a body, a closure plate secured to said body to define a chamber therewithin, said body having a first fitting adapted for sensing the pressure in said induction passage downstream of said throttle and a second fitting adapted for connection to said vacuum motor, said closure plate having an air bleed opening for admitting air to said chamber to increase the pressure therein, a bleed valve disposed in and controlling flow through said air bleed opening, means adapted for response to the temperature of induction air flow in said induction passage downstream of said inlets for positioning said bleed valve to permit increased air flow through said air bleed opening upon an increase in said induction air flow temperature and for positioning said bleed valve to decrease air flow through said air bleed opening upon a decrease in said induction air flow temperature, said second fitting having a valve seat formed therein, a pressure responsive non-return valve engageable with said valve seat when the pressure in said first fitting exceeds the pressure in said second fitting to prevent flow from said first fitting through said chamber to said second fitting and disengaged from said valve seat when the pressure in said second fitting exceeds the pressure in said first fitting to permit flow from said second fitting through said chamber to said first fitting, and a temperature responsive member disposed in said chamber and engageable with said non-return valve at temperatures above a selected level to disengage said non-return valve from said valve seat to permit flow through said chamber both from said first fitting to said second fitting and from said second fitting to said first fitting, said temperature responsive member being disengaged from said non-return valve at temperatures below said selected level to permit said non-return valve to engage said valve seat, said second fitting being adjustable relative to said temperature responsive member for varying the selected temperature level above which said temperature responsive member disengages said non-return valve from said valve seat, whereby when the temperature in said chamber is below said selected level said non-return valve permits flow from said vacuum motor to said induction passage and prevents flow from said induction passage and said air bleed opening to said vacuum motor and said vacuum motor positions said valve means to maximize warmed air flow through said second inlet and minimize ambient air flow through said first inlet, and whereby when the temperature in said chamber is above said selected level said temperature responsive member disengages said non-return valve from said valve seat and said vacuum motor senses the pressure created in said chamber by the induction passage pressure sensed through said first fitting and the air flow admitted through said air bleed opening and positions said valve means accordingly.

* * * * *